United States Patent [19]

Smids

[11] Patent Number: 4,612,030

[45] Date of Patent: Sep. 16, 1986

[54] METHOD AND APPARATUS FOR MAKING VARIEGATED, CATHEDRAL, ANTIQUE OR FLASHED GLASS IN A CONTINUOUS SHEET

[76] Inventor: Ronald E. Smids, 29210 NE. 2nd Pl., Carnation, Wash. 98014

[21] Appl. No.: 743,686

[22] Filed: Jun. 11, 1985

[51] Int. Cl.[4] .................... C03B 15/04; C03B 15/10
[52] U.S. Cl. .......................................... 65/91; 65/96; 65/101; 65/121; 65/199
[58] Field of Search .................. 65/91, 96, 101, 121, 65/198, 199, 253, 255, 193

[56] References Cited

U.S. PATENT DOCUMENTS

| | | | |
|---|---|---|---|
| 2,263,493 | 11/1941 | Habert | 65/193 |
| 3,218,143 | 11/1965 | Lajarte | 65/121 |
| 3,419,374 | 12/1968 | Offenbacher et al. | 65/91 X |
| 4,133,666 | 1/1979 | Rhodes . | |

FOREIGN PATENT DOCUMENTS 674223  6/1952  United Kingdom .................. 65/121

Primary Examiner—Arthur Kellogg
Attorney, Agent, or Firm—Seed and Berry

[57] ABSTRACT

A method and apparatus are disclosed for making ornamental glass. A molten glass mixture, formed into a continuous plastic sheet, is subjected to a single or multiple bilateral stretching before being annealed.

45 Claims, 6 Drawing Figures

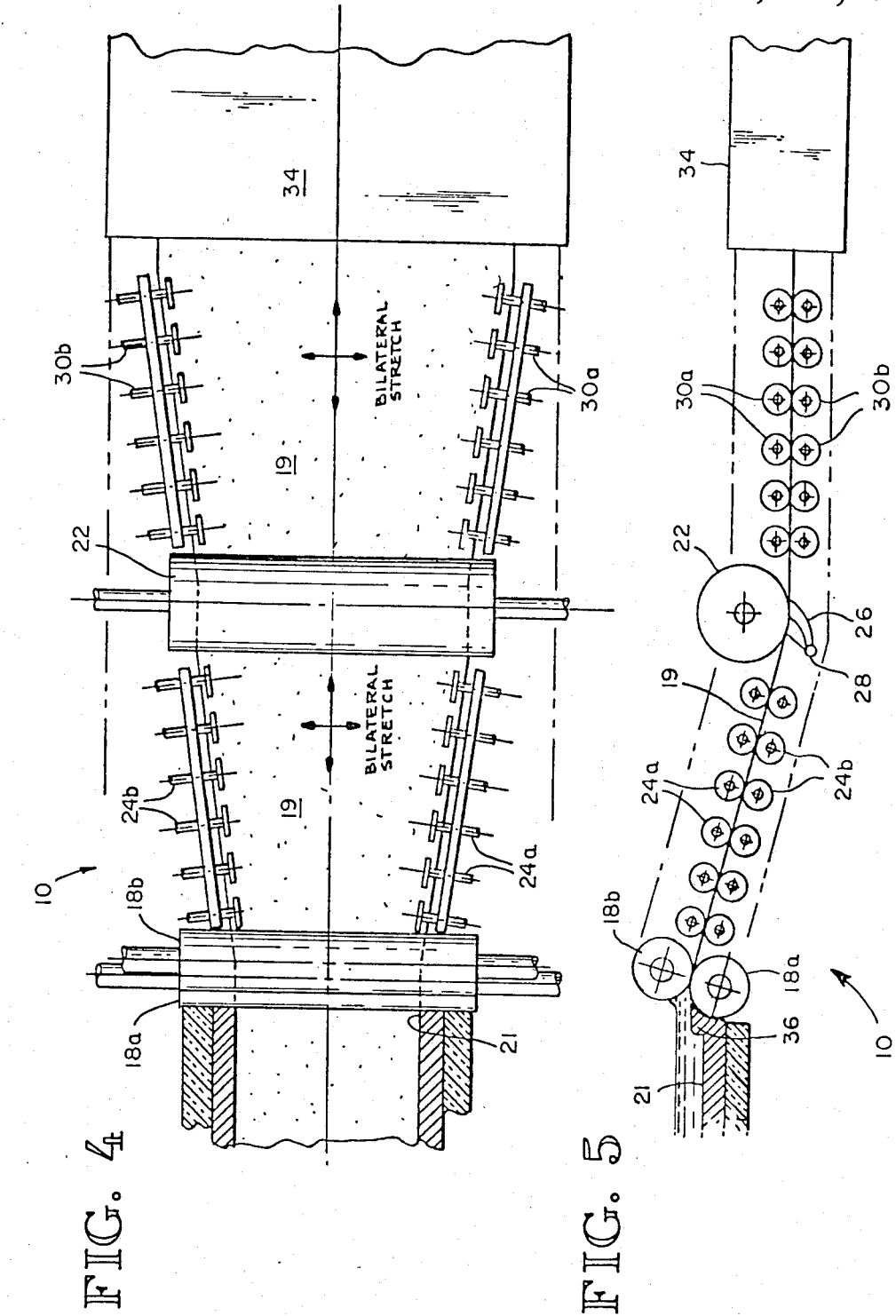

METHOD AND APPARATUS FOR MAKING VARIEGATED, CATHEDRAL, ANTIQUE OR FLASHED GLASS IN A CONTINUOUS SHEET

DESCRIPTION

1. Technical Field

This invention relates to a method and apparatus for making variegated, cathedral, antique or flashed glass in continuous sheet form.

2. Background of the Invention

Ornamental glasses are used in window panes, lamp shades or for other purposes to create an aesthetic appearance. The term "variegated glass" refers to ornamental glass made by incompletely mixing two or more difficult colored glass components while they are in the molten state. The term "cathedral glass" refers to ornamental transparent glass of a single color. The term "antique glass" refers to ornamental glass containing random striations running generally at random angles to the length dimension of the glass. The term "flashed glass" refers to ornamental glass which is generally semi-transparent or opaque containing randomly formed glass of one color on one side and another color on the opposite side.

Reference is made to U.S. Pat. No. 4,133,666, which discloses a method and apparatus for making variegated glass in a continuous sheet.

DISCLOSURE OF THE INVENTION

A principal object of this invention is to provide a method and apparatus for manufacturing ornamental glass such as variegated, cathedral, antique or flashed glass in continuous sheet form.

This and other objects are carried out by heating first and second quantities of glasses to a molten state, separately introducing each of the glass quantities into a vessel which allows the two to contact each other along an interface line to form a laminated mixture, feeding the laminated molten fixture into the feed side of a pair of counterrotating forming rolls which press the molten glass mixture into a continuous plastic elongated sheet, stretching the plastic continuous elongated sheet in the machine direction, i.e., the direction of travel of the feed rolls while simultaneously stretching the plastic continuous elongated sheet in a direction transverse to the machine direction, and annealing the stretched glass sheet. If desired, the glass may be subjected to a second bilateral stretch. A similar procedure is used with glass of a single color.

BRIEF DESCRIPTION OF THE DRAWINGS

FIG. 4 is a top view of a horizontally oriented apparatus for forming variegated, cathedral, or antique glass and subjecting the formed glass sheet to two separate bilateral stretching operations, with both bilateral stretches occurring with the sheet being drawn horizontally; and FIG. 5 is a side view of the apparatus of FIG. 4.

BEST MODE FOR CARRYING OUT THE INVENTION

Figure 1:
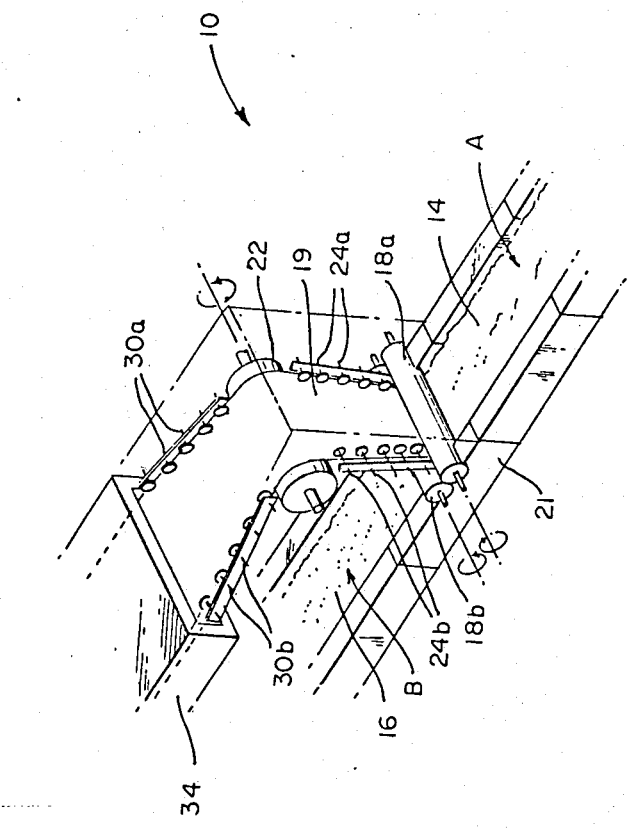
FIG. 1 is a schematic view of an apparatus for forming variegated, cathedral, antique or flashed glass and subjecting it to two separate bilateral stretching operations, with the second bilateral stretch occurring with the sheet being drawn horizontally.
Figure 2:
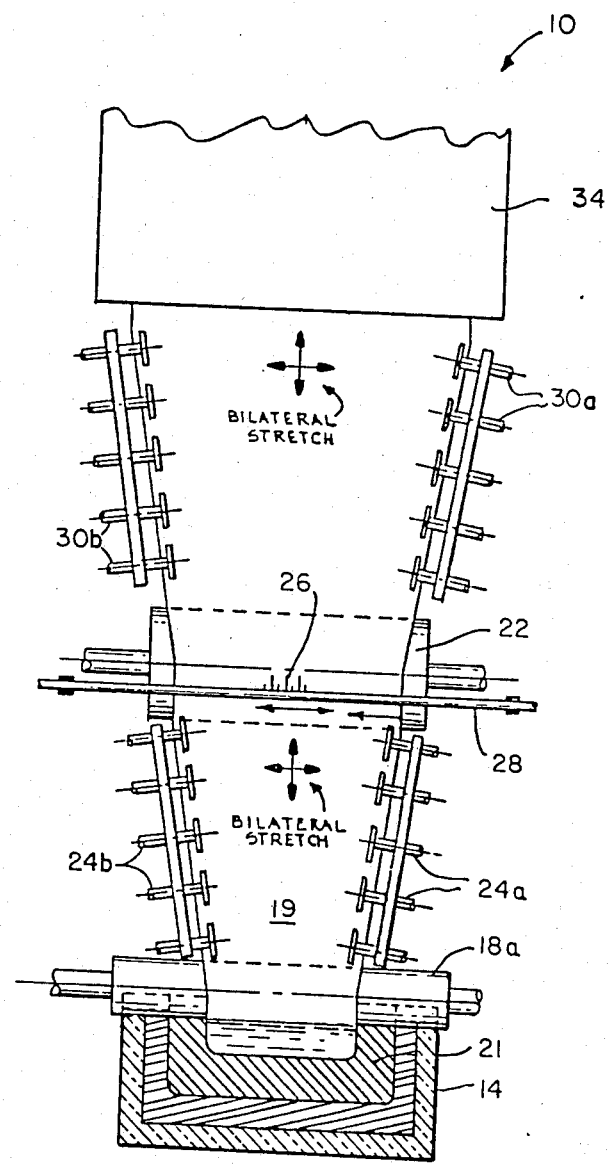
FIG. 2 is a front view of a vertically oriented apparatus for forming variegated, cathedral, antique or flashed glass and subjecting the formed glass sheet to two separate bilateral stretching operations, with the second bilateral stretch occurring with the sheet being drawn vertically.
Figure 3:
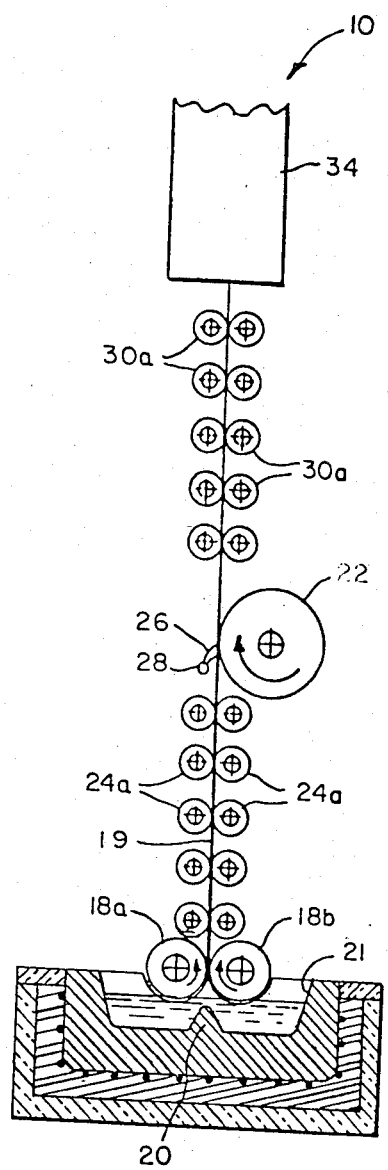
FIG. 3 is a side view of the apparatus of FIG. 2.

FIGS. 1-3 illustrate an apparatus 10 which may be used for making variegated, cathedral, antique or flashed glass in a continuous manner. FIGS. 4-5 illustrate an apparatus 10 which may be used for making variegated, cathedral and antique glass in a continuous manner. As shown in FIG. 1, raw glass material heated to the molten state by furnaces (not shown) is received in respective channels 14 and 16 made of refractory material and covered by a structure (not shown) to maintain the elevated temperature of the glass as it flows from the furnaces into the channels and to the forming operation. Additional heat may be introduced into the covered structure if needed. The juncture of the discharge ends of the channels 14 and 16 define a vessel 21. Alternatively, the molten glass may be hand ladled directly into a pot forming the vessel 21 as shown in FIGS. 2 and 3.

Adjacent to the vessel 21 is a pair of counterrotating, water cooled forming rollers 18a and 18b which define a gap therebetween into which two sheets of plastic glass are fed and pressed into a ribbon or continuous sheet 19. The channels 14 and 16 deliver glass to vessel 21, or the glass is hand ladeled into the vessel. The vessel 21 may include a separtor 20 such as shown in FIG. 3, which helps to minimize mixing of the molten glass until in close proximity with the rollers 18a and 18b and to direct the plastic glass into the gap of the forming rollers.

As the continuous sheet of glass 19 emerges from the downstream side of the rollers, it is still soft and pliable, and is drawn substantially vertically up to and over a roller 22 in the embodiments of FIGS. 1-3. While in this state, the glass sheet is subjected to a bilateral stretching operation to improve the surface finish of the glass. The continuous sheet of glass 19 is subjected to stretching in the machine direction, i.e., the direction of travel of the forming rollers and of the plastic glass sheet by the roller 22, whose rotational speed is greater than that of the forming rollers 18a and 18b by an amount equal to a desired percentage. Alongside the lateral edges of the continuous sheet are a series of pairs of diverging driven pinch rollers 24a and 24b which pinch the plastic glass sheet between them and stretch the glass sheet in a direction transverse to the machine direction by a desired percentage. The pinch rollers 24a and 24b also provide an amount of longitudinal pull on the sheet 19 to further assist in the stretching in the machine direction. The plastic glass sheet 19 then enters an annealing furnace 34 which also contains numerous rollers which longitudinally pull on the sheet.

With this arrangement, an improved quality glass sheet is produced, since both surfaces of the glass sheet are exposed to air during the forming operation and thus have equal quality. This is to be compared to conventional glass manufacture using a pair of forming rollers, where the molten glass formed into the one surface of the glass sheet passes over a refractory material, such as a lip block, while the molten glass formed into the other surface is exposed to air, thus producing unequal surface quality.

Using the present invention, after being subjected to the initial bilateral stretch, the glass sheet 19 downstream from the stretching roller 22 may be subjected to a second bilateral stretch before being annealed. The second bilateral stretch is performed in the same manner as the first. The glass sheet 19 may be stretched in the machine direction using a second stretching roller (not shown) or using the rollers in the annealing furnace 34, with the additional amount of stretch depending on the speed of rotation of the second stretching roller relative to the speed of rotation of the first stretching roller 22. The continuous glass sheet 19 may be stretched transverse to its direction of movement by a second series of pairs of diverging driven pinch rollers 30a and 30b, with the additional amount of stretching in the transverse direction depending upon the amount of divergence of the second set of pinch rollers relative to the first set of pinch rollers 24a and 24b.

The second bilateral stretch may occur with the glass sheet 19 being drawn substantially horizontally after passing over the roller 22, as shown in FIG. 1, or with the glass sheet being drawn substantially vertically, as shown in FIGS. 2 and 3. Alternatively, the apparatus 10 may have the fully horizontal configuration shown in FIGS. 4 and 5, particularly when the apparatus is used to manufacture variegated, cathedral or antique glass. With the arrangement of FIGS. 4 and 5, the benefit of equal surface quantlity discussed above is lost, since the molten glass toward the lower forming roller 18a in FIG. 4 passes over a lip block 36 made of refractory material.

If it is desired to make striations in antique glass or flashed glass, a rake 26 is mounted on a shaft 28. The shaft 28 is positioned adjacent to the roller 22 and has a motion which is transverse to the direction of movement of the glass sheet 19. The rake 26 is moved transversely across the glass sheet 19 in a random manner to create an antiqued or striated appearance. The rake may be located just before the stretching roller 22 or right at the stretching roller and may be mounted either above or below the roller. The rake 26 is shown in FIGS. 2 and 3 for the embodiment of the apparatus 10, having the glass sheet 19 drawn vertically for the second bilateral stretch, and in FIG. 5 for the embodiment, having the glass sheet 19 drawn horizontally for both bilateral stretches.

Figure 1A:
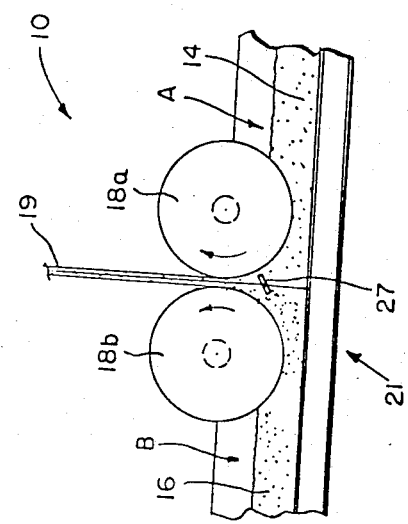
FIG. 1A is an enlarged schematic sectional view of the forming rollers of the apparatus of FIG. 1 arranged for forming variegated glass.

Referring to FIGS. 1 and 1A, when used to manufacture variegated glass, glass having color A is introduced into one side of the channel 14 and glass having color B into the other channel 16. The two differently colored molten glass mixtures meet along an interface line directly beneath the gap of the forming rollers 18a and 18b. For the manufacture of variegated glass, the separator 20 is not used. Variegations in the glass mixture are formed by using a stirring device 27 which moves transverse to the direction of rotation of the forming rollers and across the width of the forming rollers to stir the mixture of molten glass across its width to produce a serpentine-shaped distribution of the differently colored molten glass components which initially contact each other along the interface. The stirring device may be a steel rod having a portion which extends into the glass mixture, a paddle or other suitable device. Stirring may also be accomplished manually or by the use of any number of available devices which operate in a reciprocal manner across the width of the forming rollers.

As previously described, once the glass mixture is formed and extended through the forming rollers 18a and 18b, the resulting plastic glass sheet is subjected to stretching in both the machine and transverse directions by the stretching roller 22 and the series of pairs of pinch rollers 24a and 24b. Likewise, the glass sheet 19 may be subjected to a second bilateral stretching operation using the second series of pairs of pinch rollers 30a and 30b before the plastic sheet is annealed in the annealing furnace 34.

When used to manufacture flashed glass, two colors of glass are also used, one forming each side of the resulting glass sheet 19; however, the glass forming one side of the glass sheet may be semi-transparent or clear. When used to manufacture cathedral glass, a single color glass is used.

In the apparatus 10 illustrated in FIGS. 1-5, the stretching operations are carried out under a suitable cover whose interior is heated to maintain the glass sheet in the plastic state.

Ornamental glass produced by the method and apparatus described is aesthetically pleasing. The various types of glasses which can be formed using the apparatus of this invention vary widely in terms of their appearance and usefulness.

I claim:

1. A method of making flashed glass in continuous sheet form, comprising:
   heating a first quantity glass with one color and a second quantity of glass with another color to the molten state;
   separately introducing each of the differently colored molten glass into a vessel adjacent to a pair of counterrotating forming rollers such that the differently colored molten glass contact each other along an interface to form a laminated molten glass mixture having two different colored layers;
   feeding the laminated molten glass mixture into the feed side of the pair of forming rollers which press the layers of the laminated molten glass mixture together into a continuous laminated plastic elongated sheet;
   stretching the continuous laminated plastic elongated sheet in the machine direction, i.e., the direction of sheet travel produced by the forming rollers;
   simultaneously with the stretching in the machine direction stretching the continuous laminated plastic elongated sheet in a direction transverse to the machine direction; and
   annealing the stretched laminated plastic glass sheet.

2. The method of claim 1, including subjecting the stretched, continuous plastic elongated sheet to a second stretching operation in both the machine and transverse directions prior to annealing the glass sheet.

3. The method of claim 1 wherein stretching of the plastic sheet in the machine direction is carried out by feeding the plastic sheet over a roller whose speed of rotation is greater than the rotational speed of the forming rollers.

4. The method of claim 1 wherein stretching of the plastic sheet in a transverse direction is carried out by grasping the lateral edges of the continuous plastic sheet with a series of pairs of laterally spaced-apart pinch rollers, each pair being spaced a greater distance apart than the preceding pair and angled so as to continuously stretch the plastic sheet laterally.

5. The method of claim 1 wherein the forming rollers are positioned above the vessel and the laminated molten glass mixture is fed substantially vertically to the forming rollers to substantially equally expose the two layers of glass of the molten glass mixture to air prior to reaching the rollers.

6. A method of making variegated glass in continouous sheet form, comprising:
heating a first quantity of glass with one color and a second quantity of glass with another color to the molten state;
separately introducing each of the differently colored glass into a vessel such that the two differently colored molten glass contact each other along an interface;
stirring the molten glass mixture at the interface to break up and disperse the colors of the two differently colored molten glass in each other to form a multicolored molten glass mixture having a generally serpentine configuration of one color within the other;
feeding the multicolored molten glass mixture with the generally serpentine color configuration into the feed side of a pair of forming rollers which press the molten glass mixture into a multicolored continuous plastic elongated sheet;
stretching the continuous plastic elongated sheet in the machine direction, i.e., the direction of sheet travel produced by the forming rollers;
simultaneously with the stretching in the machine direction stretching the continuous plastic elongated sheet in a direction tranverse to the machine direction; and
annealing the stretched multicolored plastic glass sheet.

7. The method of claim 6, including subjecting the stretched, continuous plastic elongated sheet to a second simultaneous stretching operation in both the machine and transverse directions prior to annealing the plastic sheet.

8. The method of claim 6 wherein stretching of the plastic sheet in the machine direction is carried out by feeding the plastic sheet over a roller whose speed of rotation is greater than the rotational speed of the forming rollers.

9. The method of claim 6 wherein stretching of the plastic sheet in a tranverse direction is carried out by grasping the lateral edges of the continuous plastic sheet with a series of pairs of laterally spaced-apart and outwardly angled pinch rollers, each pair being spaced a greater distance apart than the preceding pair so as to continuously stretch the plastic sheet laterally.

10. The method of claim 6 wherein the forming rollers are positioned above the vessel and the multicolored molten glass mixture with a generally serpentine color configuration is fed substantially vertically to the forming rollers to substantially equally expose both surfaces of the multicolor molten glass mixture to air prior to reaching the forming rollers.

11. A method of making antique glass or the like in continouous sheet form, comprising:
heating a quantity of glass to the molten state;
introducing the molten glass into a vessel adjacent to a pair of counterrotating forming rollers;
feeding the molten glass into the feed side of the forming rollers which press the molten glass into a continuous plastic elongated sheet;
stretching the continouos plastic elongated sheet in the machine direction, i.e., the direction of sheet travel produced by the forming rollers;
simultaneously with the stretching in the machine direction stretching the continuous plastic elongated sheet in a direction transverse to the machine direction;
striating the surface of the stretched continuous plastic elongated sheet transversely across its width to create an antique-looking glass appearance; and
annealing the stretched antique-looking plastic glass sheet.

12. The method of claim 11, including subjecting the stretched, continuous plastic elongated sheet to a second simultaneous stretching operation in both the machine and transverse directions prior to annealing the plastic sheet.

13. The method of claim 11 wherein stretching of the plastic sheet in the machine direction is carried out by forming the plastic sheet over a roller whose speed of rotation is greater than the rotational speed of the forming rollers.

14. The method of claim 11 wherein stretching of the plastic sheet in the tranverse direction is carried out by grasping the lateral edges of the continuous plastic sheet with a series of pair of laterally spaced-apart and outwardly angled pinch rollers, each pair being spaced a greater distance apart from the preceding pair so as to continuously stretch the plastic sheet laterally.

15. The method of claim 11 wherein the forming rollers are positioned above the vessel and the molten glass is fed substantially vertically to the forming rollers to substantially equally expose both surfaces of the molten glass to air prior to reaching the forming rollers.

16. A method of making cathedral glass or the like in continuous sheet form, comprising:
heating a quantity of glass to the molten state;
introducing the molten glass into a vessel adjacent to a pair of counterrotating forming rollers;
feeding the molten glass into the feed side of the forming rollers which press the molten glass into a continuous plastic elongated sheet;
stretching the continuous plastic elongated sheet in the machine direction, i.e., the direction of sheet travel produced by the forming rollers;
simultaneously with the stretching in the machine direction stretching the continuous plastic elongated sheet in a direction transverse to the machine direction; and
annealing the stretched plastic glass sheet.

17. The method of claim 16, including subjecting the stretched, continuous plastic elongated sheet to a second simultaneous stretching operation in both the machine and transverse directions prior to annealing the plastic sheet.

18. The method of claim 16 wherein stretching of the plastic sheet in the machine direction is carried out by forming the plastic sheet over a roller whose speed of rotation is greater than the rotational speed of the forming rollers.

19. The method of claim 16 wherein stretching of the plastic sheet in the transverse direction is carried out by grasping the lateral edges of the continuous plastic sheet with a series of pairs of laterally spaced-apart and outwardly angled pinch rollers, each pair being spaced a greater distance apart than the preceding pair so as to continuously stretch the plastic sheet laterally.

20. The method of claim 16 wherein the forming rollers are positioned above the vessel and the molten glass is fed substantially vertically to the forming rollers to substantially equally expose both surfaces of the molten glass to air prior to reaching the forming rollers.

21. An apparatus for making flashed glass in continuous sheet form, comprising:

heating means for heating first and second quantities of differently colored glass to the molten state;

means for separately introducing each of the differently colored molten glass into a vessel, the vessel providing an interface portion in which the differently colored molten glass can contact each other to form a laminated molten glass mixture having two differently colored layers;

a pair of counterrotating forming rollers positioned adjacent to the vessel for feeding the laminated molten glass mixture into the feed side of the forming rollers, the forming rollers pressing the layers of the laminated molten glass mixture together into a continuous laminated plastic elongated sheet;

stretching means for stretching the continuous laminated plastic elongated sheet in the machine direction, i.e., the direction of sheet travel produced by the forming rolls, and for simultaneously with the stretching in the machine direction stretching the continuous laminated plastic elongated sheet in a direction transverse to the machine direction; and annealing means for annealing the stretched laminated plastic glass sheet.

22. The apparatus of claim 21, further including another stretching means for stretching the continuous laminated plastic elongated sheet in a second stretching operation simultaneously in both the machine and transverse directions prior to annealing the glass sheet.

23. The apparatus of claim 21 wherein the means for stretching the plastic sheet in the machine direction includes a roller over which the plastic sheet is fed, the roller having a speed of rotation greater than the rotational speed of the forming rollers.

24. The apparatus of claim 21 wherein the means for stretching the plastic sheet in a transverse direction includes a series of pairs of laterally spaced-apart and outwardly angled pinch rollers for grasping the lateral edges of the continuous plastic glass sheet, each pair being spaced a greater distance apart than the preceding pair and angled so as to continuously stretch the sheet of glass laterally.

25. The apparatus of claim 21 wherein the pair of forming rollers is positioned above the vessel to feed the laminated molten glass mixture substantially vertically thereto to substantially equally expose the two layers of glass of the molten glass mixture to air prior to reaching the forming rollers.

26. The apparatus of claim 21, further including means positioned in the vessel and adjacent to the forming rollers for maintaining separation of the differently colored glass except in the interface portion of the vessel, the interface portion being toward the forming rollers and the portion of the vessel from which the laminated molten glass mixture is withdrawn for feeding to the forming rollers, the means for separately introducing the molten glass introducing one of the differently colored molten glass to each side of the separation means.

27. An apparatus for making variegated glass in continuous sheet form, comprising:

heating means for heating first and second quantities of differently colored glass to the molten state;

means for introducing each of the differently colored glass into a vessel, the vessel providing an interface portion along which the differently colored molten glass can contact each other;

stirring means for stirring the molten glass mixture in the interface portion to break up and disperse the colors of the two differently colored molten glass in each other to form a multicolored molten glass mixture having a generally serpentine configuration of one color within the other;

a pair of counterrotating forming rollers positioned adjacent to the vessel for feeding the multicolored molten glass mixture with the generally serpentine color configuration into the feed side of the forming rollers, the forming rollers pressing the molten glass mixture into a multicolored continuous plastic elongated sheet;

stretching means for stretching the continuous plastic elongated sheet in the machine direction, i.e., the direction of sheet travel produced by the forming rollers, and for simultaneously with the stretching in the machine direction stretching the continuous plastic elongated sheet in a direction transverse to the machine direction; and annealing means for annealing the stretched multicolored plastic glass sheet.

28. The apparatus of claim 27, further including another stretching means for stretching the continuous plastic elongated sheet in a second stretching operation simultaneouly in both the machine and transverse directions prior to annealing the glass sheet.

29. The apparatus of claim 27 wherein the means for stretching the plastic sheet in the machine direction includes a roller over which the plastic sheet is fed, the roller having a speed of rotation greater than the rotational speed of the forming rollers.

30. The apparatus of claim 27 wherein the means for stretching the plastic sheet in a transverse direction includes a series of pairs of laterally spaced-apart and outwardly angled pinch rollers for grasping the lateral edges of the continuous plastic glass sheet, each pair being spaced a greater distance apart than the preceding pair so as to continuously stretch the sheet of glass laterally.

31. The apparatus of claim 27 wherein the pair of forming rollers is positioned above the vessel to feed the multicolored molten glass mixture substantially vertically thereto to substantially equally expose the two surfaces of the mulicolored molten glass mixture to air prior to reaching the forming rollers.

32. An apparatus for making antique glass or the like in continuous sheet form, comprising:

heating means for heating a quantity of glass to the molten state;

means for introducing the molten glass into a vessel adjacent;

a pair of counterrotating forming rollers positioned adjacent to the vessel for feeding the molten glass into the feed side of the forming rollers, the forming rollers pressing the molten glass into a continuous plastic elongated sheet;

stretching means for stretching the continuous plastic elongated plastic sheet in the machine direction, i.e., the direction of sheet travel produced by the forming rollers, and for simultaneously with the stretching in the machine direction stretching the continuous plastic elongated sheet in a direction transverse to the machine direction;

raking means for striating the surface of the continuous plastic elongated sheet transversely across its width to create an antique-looking glass appearance; and annealing means for annealing the antique-looking plastic glass sheet.

33. The apparatus of claim 32, further including another stretching means for stretching the continuous plastic elongated sheet in a second stretching operation simultaneously in both the machine and transverse directions prior to annealing the glass sheet.

34. The apparatus of claim 32 wherein the means for stretching the plastic sheet in the machine direction includes a roller over which the plastic sheet is fed, the roller having a speed of rotation greater than the rotational speed of the forming rollers.

35. The apparatus of claim 32 wherein the means for stretching the plastic sheet in the transverse direction includes a series of pairs of laterally spaced-apart and outwardly angled pinch rollers for grasping the lateral edges of the continuous plastic glass sheet, each pair being spaced a greater distance apart than the preceding pair so as to continuously stretch the plastic sheet laterally.

36. The apparatus of claim 32 wherein the pair of forming rollers is positioned above the vessel to feed the molten glass mixture substantially vertically thereto to substantially equally expose both surfaces of the molten glass to air prior to reaching the forming rollers.

37. An apparatus for making cathedral glass or the like in continuous sheet form, comprising:

heating means for heating a quantity of glass to the molten state;

means for introducing the molten glass into a vessel;

a pair of counterrotating forming rollers positioned adjacent to the vessel for feeding the molten glass into the feed side of the forming rollers, the forming rollers pressing the molten glass into a continuous plastic elongated sheet;

stretching means for stretching the continuous plastic elongated sheet in the machine direction, i.e., the direction of sheet travel produced by the forming rollers, and for simultaneously with the stretching in the machine direction stretching the continuous plastic elongated sheet in a direction transverse to the machine direction; and annealing means for annealing the plastic glass sheet.

38. The apparatus of claim 37, further including another stretching means for stretching the continuous plastic elongated sheet in a second stretching operation simultaneously in both the machine and transverse direction prior to annealing the glass sheet.

39. The apparatus of claim 37 wherein the means for stretching the plastic sheet in the machine direction includes a roller over which the plastic sheet is fed, the roller having a speed of rotation greater than the rotational speed of the forming rollers.

40. The apparatus of claim 37 wherein the means for stretching the plastic sheet in the transverse direction includes a series of pairs of laterally spaced-apart and outwardly angled pinch rollers for grasping the lateral edges of the continuous plastic sheet, each pair being spaced a greater distance apart than the preceding pair so as to continuously stretch the plastic sheet laterally.

41. The apparatus of claim 37 wherein the pair of forming rollers is positioned above the vessel to feed the molten glass substantially vertically thereto to substantially equally expose both surfaces of molten glass to air prior to reaching the forming rollers.

42. An apparatus for making ornamental glass in continuous sheet form, comprising:

heating means for heating a quantity of glass to the molten state;

a vessel for receiving the molten glass;

a pair of counterrotating forming rollers positioned above and adjacent to the vessel for feeding the molten glass substantially vertically to the feed side of the forming rollers to substantially equally expose both surfaces of the molten glass to air prior to reaching the forming rollers, the forming rollers pressing the molten glass into a continouous plastic elongated sheet;

stretching means for stretching the continuous plastic elongated sheet in the machine direction, i.e., the direction sheet travel produced by the forming rollers, and for simultaneously with the stretching in the machine direction stretching the continuous plastic elongated sheet in a direction transverse to the machine direction; and annealing means for annealing the plastic glass sheet.

43. The apparatus of claim 42, further including another stretching means for stretching the continuous plastic elongated sheet in a second stretching operation simultaneously in both the machine and transverse directions prior to annealing the glass sheet.

44. The apparatus of claim 42 wherein the means for stretching the plastic sheet in the machine direction includes a roller over which the plastic sheet is fed, the roller having a speed of rotation greater than the rotational speed of the forming rollers.

45. The apparatus of claim 42 wherein the means for stretching the plastic sheet in the transverse direction includes a series of pairs of laterally spaced-apart and outwardly angled pinched rollers for grasping the lateral edges of the continuous plastic glass sheet, each pair being spaced a greater distance apart than the preceding pair so as to continuously stretch the plastic sheet laterally.

* * * * *